US008944825B2

(12) United States Patent
Reid-Searl et al.

(10) Patent No.: US 8,944,825 B2
(45) Date of Patent: Feb. 3, 2015

(54) TEACHING PROP

(76) Inventors: Kerry Reid-Searl, Rockhampton (AU); Rusty Slusser, Van Nuys, CA (US)

(*) Notice: Subject to any disclaimer, the term of this patent is extended or adjusted under 35 U.S.C. 154(b) by 164 days.

(21) Appl. No.: 13/231,648

(22) Filed: Sep. 13, 2011

(65) Prior Publication Data

US 2013/0059279 A1 Mar. 7, 2013

(30) Foreign Application Priority Data

Sep. 1, 2011 (AU) ................................ 2011218695

(51) Int. Cl.
*G09B 23/28* (2006.01)
*G09B 23/30* (2006.01)

(52) U.S. Cl.
CPC ..................................... *G09B 23/30* (2013.01)
USPC .......................................... 434/267; 434/268

(58) Field of Classification Search
USPC ......... 434/262, 267, 268, 270, 272, 273, 295, 434/296
See application file for complete search history.

(56) References Cited

U.S. PATENT DOCUMENTS

| | | | | |
|---|---|---|---|---|
| 2,945,304 A | * | 7/1960 | Niiranen et al. | 434/268 |
| 4,439,162 A | | 3/1984 | Blaine | |
| 4,773,865 A | * | 9/1988 | Baldwin | 434/268 |
| 4,789,340 A | | 12/1988 | Zikria | |
| 5,314,339 A | | 5/1994 | Aponte | |
| 5,839,904 A | * | 11/1998 | Bloom | 434/268 |
| 5,945,056 A | * | 8/1999 | Day et al. | 264/250 |
| 6,093,475 A | * | 7/2000 | Geller | 428/166 |
| 7,306,465 B2 | * | 12/2007 | White | 434/268 |
| 7,309,236 B1 | * | 12/2007 | Ward | 434/262 |
| 7,553,159 B1 | * | 6/2009 | Arnal et al. | 434/267 |
| 7,566,328 B2 | * | 7/2009 | Hooper | 604/357 |
| 7,837,474 B1 | * | 11/2010 | Nuccio-Youngs | 434/267 |
| 8,408,920 B2 | * | 4/2013 | Speller | 434/268 |
| 8,454,368 B2 | * | 6/2013 | Ault et al. | 434/267 |
| 8,491,309 B2 | * | 7/2013 | Parry et al. | 434/272 |
| 2007/0218438 A1 | * | 9/2007 | Sanders et al. | 434/236 |
| 2007/0292829 A1 | * | 12/2007 | King et al. | 434/268 |
| 2010/0062407 A1 | | 3/2010 | Lecat | |

FOREIGN PATENT DOCUMENTS

| | | |
|---|---|---|
| CH | 323347 | 9/1957 |
| WO | 2009/019090 | 2/2009 |
| WO | 2012/003023 | 1/2010 |

* cited by examiner

*Primary Examiner* — Kurt Fernstrom
(74) *Attorney, Agent, or Firm* — Shoemaker and Mattare

(57) ABSTRACT

The present invention relates to teaching props for use in clinical education.
The teaching props are in the form of synthetic body parts adapted to be worn by the instructor to facilitate demonstration of physiological functions and clinical procedures to the students. The synthetic body parts include simulated skin or tissue and one or more internal conduits adapted to contain at least one simulated physiological fluid and is adapted to facilitate simulation of physiological functions or clinical procedures. The props allow the students to practice clinical procedures and techniques in a realistic situation without any risk of harm or discomfort to a real patient.

2 Claims, 9 Drawing Sheets

TEACHING PROP

FIELD OF INVENTION

The present invention relates to teaching props. In particular the invention relates to simulated body part props which are worn by an instructor and comprise functional features to facilitate realistic simulation of physiological functions for clinical education purposes. The present invention has particular but not exclusive application for use as a teaching prop for education of nurses.

BACKGROUND OF THE INVENTION

Teaching and demonstration of clinical procedures in a realistic situation can be difficult to achieve without resorting to the use of a real patient. Instructors in clinical practice are faced with the problem of how to achieve effective simulation of clinical procedures to allow nursing students to practice repeatedly in an environment where a real patient will not be subject to any inconvenience, discomfort or have their safety compromised.

Plastic models of patients can be used to demonstrate clinical techniques. These have limited applicability since the patient dummy cannot provide any response or interaction.

One technique for teaching clinical procedures which allows simulation of actual clinical situations involves the instructor adopting the role of the patient. This role play facilitates interplay between the instructor, the patient character and the student.

Dissociation of the patient from the identity of the instructor can be achieved by the instructor wearing a disguise. Props and accessories such as wigs, glasses, false teeth and pieces of clothing can be used to create a character. A drawback of this approach is that the students can still see the instructor's face, so they cannot dissociate completely and the students may be discouraged from accepting the character as a patient and treating them accordingly. Plastic masks have been used to disguise the tutor, but hard plastic masks are not effective since there is no life or movement in the face and this presents a barrier to the student engaging with the character. This approach is also of limited applicability in clinical teaching since there are only a restricted number of clinical procedures that can be safely practiced on the tutor.

SUMMARY OF THE INVENTION

It is an object of the present invention to provide a clinical teaching prop that overcomes at least in part one or more of the abovementioned problems.

In one aspect the present invention broadly resides in a synthetic body part teaching prop adapted to be worn by a person wherein the body part comprises simulated skin or tissue and one or more functional features to simulate medically relevant conditions.

The present invention also resides in a synthetic body part adapted to be worn by a person as a teaching prop wherein the body part comprises simulated skin or tissue and one or more internal conduits adapted to contain or passage there-through at least one simulated physiological fluid to facilitate simulation of physiological functions or clinical procedures for clinical education purposes.

The present invention also provides a synthetic body part including simulated skin or tissue adapted to be worn as a teaching prop by a person wherein the body part comprises one or more internal conduits adapted to contain or passage there-through at least one simulated physiological fluid.

The present invention further provides a synthetic body part adapted to be worn by a person as a teaching prop wherein the body part comprises simulated skin or tissue and one or more internal conduits adapted to permit simulated discharge of at least one simulated physiological fluid.

The present invention also provides a synthetic body part including simulated skin or tissue adapted to be worn by a person as a teaching prop wherein the body part comprises one or more internal conduits to allow excretion of at least one simulated physiological fluid through at least one aperture on the body part.

There is also provided a synthetic body part adapted to be worn by a person as a teaching prop wherein the body part comprises simulated skin or tissue and one or more internal conduits to allow the wearer to facilitate excretion of at least one simulated physiological fluid through at least one aperture on the body part.

The present invention further provides a synthetic body part adapted to be worn as a teaching prop by a person wherein the body part comprises simulated skin or tissue and adapted to allow the wearer to facilitate excretion of at least one simulated physiological fluid through at least one aperture on the body part.

The present invention also provides a synthetic body part adapted to be worn by a person as a teaching prop wherein the body part comprises simulated skin or tissue and one or more clinically relevant features selected from body apertures, pulse, vasculature, surgical wound, hematoma and stoma.

The simulated body parts of the present invention comprise functional features which represent medically relevant conditions or perform physiological functions relevant to a clinical situation. In use, the body parts are intended to be worn by an instructor to allow demonstration and practice of a wide variety of simulated clinical procedures. Clinical procedures comprise inserting and removing sutures or staples, giving injections (intra-venous, subcutaneous or intra-muscular); inserting and removing cannulae; removal of a drain; obtaining blood samples; inserting and removing catheters; stoma management; tracheotomy management; wound management; management of bleeding etc. The instructor can facilitate simulated emission of one or more physiological fluids. The instructor can also provide responses by way of sound and movement including the mimicking of pain, fear, or distress in response to clinical procedures such as injections or removal of a catheter, drain or sutures.

The synthetic body part may be adapted to allow the wearer to control physiological functions including bleeding, urination, discharge from a wound or ulcer; exudate from a stoma, etc.

Preferably the body part comprises a silicone skin or tissue. Preferably the body part is made of thin high grade silicone sheet.

Preferably the synthetic body part is a head, torso, arm or leg.

Preferably the synthetic body part has simulated vasculature. Preferably the simulated vasculature comprises one or more simulated blood vessels. Preferably the blood vessels are made of silicone. Preferably the blood vessels contain simulated blood. Preferably the blood vessels are adapted to facilitate venepuncture procedures such as intravenous injection or withdrawal of simulated blood. Preferably the vessels are adapted to facilitate insertion of a cannulum.

Preferably the simulated body part has a simulated pulse. Preferably the pulse can be controlled by the wearer. Preferably the simulated pulse is controlled by the wearer altering the pressure on the plunger of an air filled syringe attached to a closed system including a length of tubing attached to a balloon end at the pulse point under the simulated skin or tissue.

Preferably the body part has one or more simulated surgical incisions. Preferably an incision is adapted to be fitted with surgical closures such as sutures or staples to enable students to practice application and removal of the closures.

In a further embodiment the present invention provides a synthetic body part including simulated skin or tissue adapted to be worn by a person as a teaching prop wherein the body part is a head and comprises one or more internal conduits adapted to contain or passage there-through at least one simulated physiological fluid.

In another embodiment the present invention provides a synthetic body part including simulated skin or tissue adapted to be worn by a person wherein the body part is a head adapted to allow the wearer to simulate excretion of at least one physiological fluid through at least one aperture on the body part.

The head may be a full head mask or a full head and neck mask, or a full head, neck and upper chest mask which is pulled over the head. Preferably the mask comprises a nose, lips and ears. Preferably the mask has apertures to accommodate the wearer's eyes and mouth. The mask may comprise male or female features. Where the mask is female, preferably the mask also comprises an upper chest section including simulated breasts.

Preferably the neck opening of the mask comprises mesh reinforcement to prevent tearing when the mask is being donned and removed.

Preferably the mask is made from silicone. Preferably the mask comprises hair embedded into a scalp portion of the silicone mask. Preferably the mask comprises eyebrow hair embedded into the silicone forming the brow portion.

Preferably the mask is provided with an opening in the anterior area of the neck to accommodate a tracheotomy tube, such as a Shiley's tube, to facilitate teaching of tracheotomy management.

Preferably the nose comprises an aperture connected to an internal conduit to facilitate one or more simulated physiological fluids to be expelled from the nostrils under the control of the wearer.

Preferably one or both ears comprise an aperture connected to an internal conduit to facilitate expulsion of one or more simulated physiological fluids from the ear canal under the control of the wearer.

Preferably the mouth of the mask comprises an aperture connected to an internal conduit to allow one or more simulated physiological fluids to be expelled from the mouth under the control of the wearer.

Preferably the mask is provided with a simulated haemotoma connected to a fluid filled bulb by an internal conduit to allow the appearance of the haemotoma to be controlled by the wearer.

Preferably an internal conduit is made of silicone. Preferably an end of the conduit remote from the aperture on the surface of the body part is adapted to engage with the nozzle of a fluid-filled syringe. Where the expulsion of a simulated physiological fluid is controlled by the wearer, preferably this is achieved by operation of a liquid filled syringe attached at an end of an internal conduit remote from an aperture on the surface of the body part.

The mask may be worn in combination with other synthetic body parts. The mask may also be worn in combination with other props such as spectacles. Preferably the mask is worn in combination with appropriate clothing such as pajamas, other nightwear or preferred clothing.

In a further embodiment the present invention provides a silicone simulated body part adapted to be worn by a person as a teaching prop wherein the body part is a leg and comprises simulated skin or tissue and one or more internal conduits adapted to contain or passage there-through at least one simulated physiological fluid.

The present invention also provides a synthetic body part adapted to be worn by a person as a teaching prop wherein the body part is a leg including simulated skin or tissue and adapted to allow the wearer to simulate excretion of at least one physiological fluid through at least one aperture on the body part.

Preferably the synthetic leg comprises a foot portion. Preferably the leg is in the form of a silicone stocking.

Preferably the synthetic leg is worn in conjunction with a face mask in accordance with the present invention.

Preferably the synthetic leg is adapted to mimic a pulse. Preferably the simulated pulse is located on the foot at the point of the dorsalis pedis artery. Preferably the pulse is controlled by the wearer. Preferably the pulse is controlled by the wearer altering the pressure on a plunger of an air filled syringe attached by the syringe nozzle to an internal conduit of silicone tubing closed by a balloon end positioned under the simulated skin or tissue in the location of the dorsalis pedis.

Preferably the leg comprises a simulated venous ulcer. Preferably the ulcer is adapted to exude a simulated physiological fluid under the control of the wearer. Preferably the simulated ulcer is connected to an internal conduit such as a piece of silicone tubing. The other end of the conduit is adapted to engage with the nozzle of a fluid filled syringe to allow the wearer to simulate excretion of a physiological fluid from the ulcer by operating the syringe.

In another embodiment the present invention provides a simulated body part adapted to be worn by a person as a teaching prop wherein the body part is an arm and comprises simulated skin or tissue and one or more internal conduits adapted to contain or passage there-through at least one simulated physiological fluid.

Preferably the synthetic arm is a forearm including a hand portion. Preferably the simulated skin or tissue is made of silicone. Preferably the synthetic arm is in the form of a silicone glove.

Preferably the synthetic arm is worn in conjunction with a face mask in accordance with the present invention.

Preferably the synthetic arm is adapted to mimic a radial pulse. Preferably the pulse is controlled by the wearer. Preferably the pulse is controlled by the wearer altering the pressure on a plunger of an air filled syringe attached by the syringe nozzle to an internal length of silicone tubing closed with a balloon end positioned under the simulated skin or tissue in the location of the radial pulse.

Preferably the arm comprises a simulated vasculature. Preferably the simulated vasculature is made from silicone tubing. Preferably the simulated vasculature comprises synthetic veins filled with simulated blood to enable demonstration and practice of venepuncture techniques such as withdrawing blood samples, administering intravenous injections and inserting venous cannulum.

In a further embodiment the present invention provides a simulated body part adapted to be worn by a person as a teaching prop wherein the body part is a torso and comprises simulated skin or tissue and one or more internal conduits adapted to contain or passage there-through at least one simulated physiological fluid.

The present invention also provides a synthetic body part adapted to be worn by a person as a teaching prop wherein the body part is a human torso including simulated skin or tissue and adapted to allow the wearer to simulate excretion of at least one physiological fluid through at least one aperture in the skin or tissue.

Preferably the simulated skin or tissue is thin high grade silicone sheet. Preferably the torso is fitted with one or more internal conduits connected to one or more apertures on the torso exterior. Preferably the conduits are made from silicone tubing. Preferably an end of an internal conduit remote from the body aperture is adapted to engage with a fluid filled syringe to allow the wearer to simulate excretion of a simulated physiological fluid by operating the syringe.

Preferably the torso comprises an abdomen, buttocks, genitalia and thighs. The genitalia may be male or female.

Preferably the synthetic torso is worn in conjunction with a face mask in accordance with the present invention.

Preferably the torso comprises one or more openings to enable the wearer to don and remove the torso. Preferably the one or more openings are located on one or both sides of the torso. Alternatively the one or more openings are located on the back of the torso. Preferably the openings around the legs and thorax are reinforced with mesh to prevent tearing of the silicone when donning or removing the torso.

Preferably the openings are fitted with hook and loop closures, such as Velcro™ closures.

Preferably the torso is fitted with internal adjustment to allow the torso to be adjusted to fit people of different sizes. Preferably the internal adjustment is achieved using a corset-type adjustment.

Preferably the torso has a simulated surgical incision including removable surgical sutures or staples for demonstrating and practicing insertion and removal of sutures and staples. Preferably the incision is in the mid-line of the abdomen.

Preferably the torso comprises one or more simulated surgical drain holes adapted to allow insertion or removal of drainage tubes.

The torso may comprise a simulated wound adapted to facilitate closure by surgical staples or sutures. Preferably the simulated wound is connected to an internal conduit and syringe which facilitates simulated bleeding under the control of the instructor.

Preferably the genitalia comprise one or more apertures connected to an internal conduit, such as a silicone tube, to allow the wearer to simulate excretion of one or more physiological fluids such as simulated urine. Preferably the simulated excretion is effected by the wearer operating a fluid filled syringe attached by its nozzle to the opposite end of the conduit to an aperture.

Preferably the genitalia comprise a synthetic urethra adapted to allow a catheter to be inserted or removed. Preferably the urethra is made of silicone.

Where the genitalia are male preferably it comprises a penis and testicles. The testicles may comprise manually discernable pathology.

Where the torso prop has female genitalia preferably it comprises a simulated vagina. Preferably it is adapted for examination and performance of simulated cervical (PAP) smears.

Preferably the torso comprises one or more injectable sites to allow students to practice injecting fluid into the abdomen and upper legs. Preferably an injectable site comprises an absorbent material to receive fluid injected through the skin or tissue. Preferably the absorbent material is contained in a cavity located under the silicone skin or tissue. Preferably the absorbent material is absorbent foam sponge or a foam pad. Preferably the absorbent material is removable and replaceable. Preferably a cavity has an internal wall on an opposite side to the skin or tissue side which is constructed from a material impervious to syringe needles to protect the wearer from being accidentally punctured by a needle. Preferably the impervious material is Teflon™ or other suitable plastic material. Suitable injectable sites comprise the buttocks, various parts of the abdomen, and the thighs.

Preferably the torso comprises a stoma. Suitably the stoma is a colostomy or an ileostomy. Preferably the stoma has a silicone tube connected to the inner wall of the torso. Preferably the other end of the silicone tube is adapted to engage with the nozzle of a fluid-filled syringe operable by the wearer to force exudate out of the stoma entrance to mimic expulsion of faecal fluid.

Preferably the torso comprises body hair embedded into the silicone.

Other simulated body parts comprise, for example, lower abdomen, genitals, buttocks, breasts or chest. These body parts may comprise one or more of the above-mentioned features. Simulated breasts may comprise manually detectable pathology.

The body part props of the present invention are suitable for educational purposes. In particular, the props are suitable for demonstrating and practicing clinical procedures and techniques. Preferably a body part prop is worn by an instructor to allow the instructor to adopt the character of a patient. Where a body part other than a mask is used, preferably it is used in combination with a mask to allow the wearer to assume the character of the patient. Preferably the body part props are used in combination with additional props such as clothing, spectacles, false teeth, hats, and wigs. Preferably the wearer adopts a voice to complement the patient character.

Suitably the body part props are worn by an instructor to allow the instructor to assume the role of a patient. This provides an effective education method since it allows three-way interplay between the instructor, the patient and the student. The knowledge and experience of the tutor can be used to realistically perform the role of the patient which helps to reinforce the teaching.

BRIEF DESCRIPTION OF THE DRAWINGS

In order that the present invention can be more readily understood and put into practical effect, reference will now be made to the accompanying drawings wherein.

DETAILED DESCRIPTION OF THE PREFERRED EMBODIMENT

Figure 1:
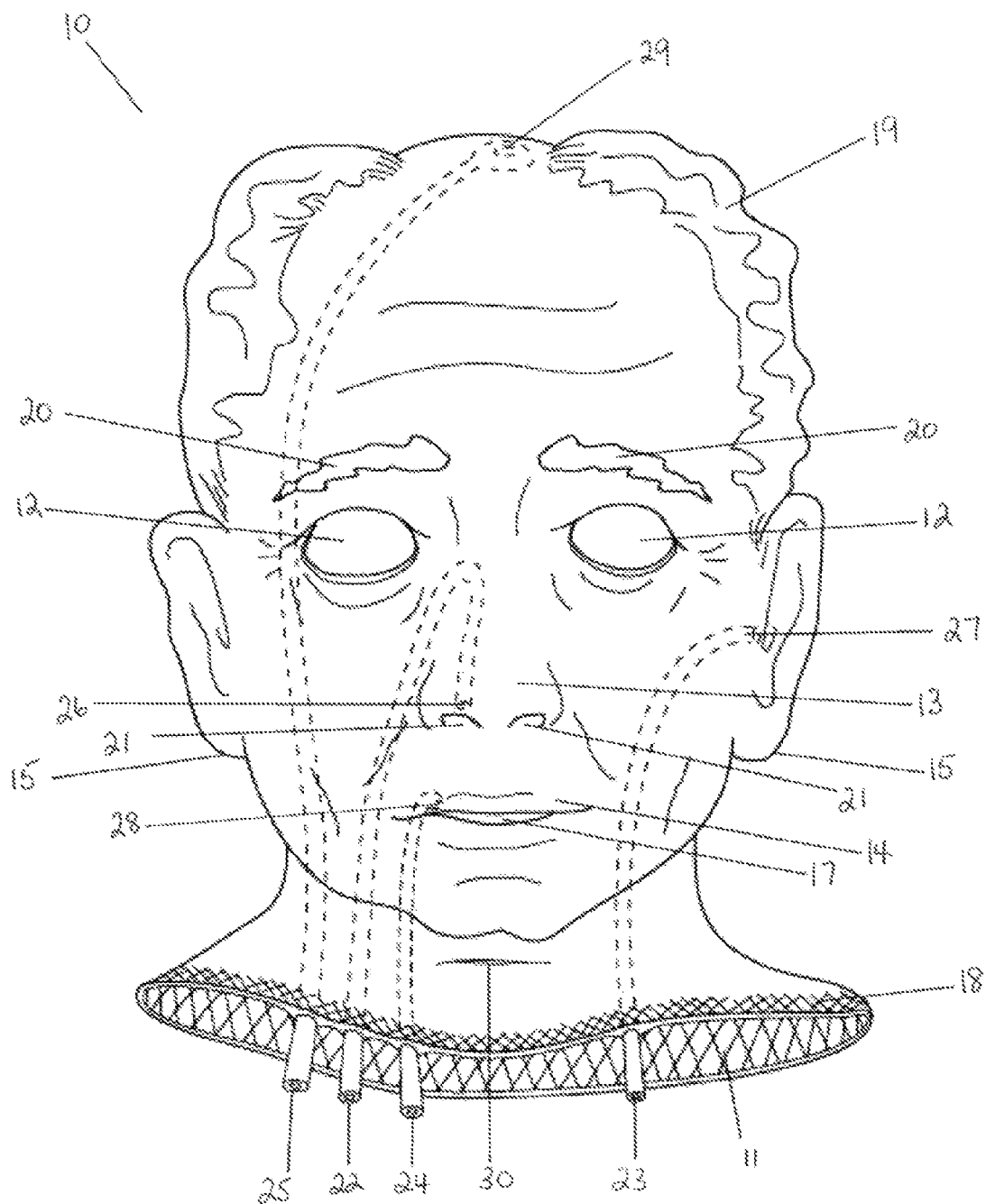
FIG. 1 is a diagrammatic front view of a male mask prop according to a first preferred embodiment of the present invention.
Figure 2:
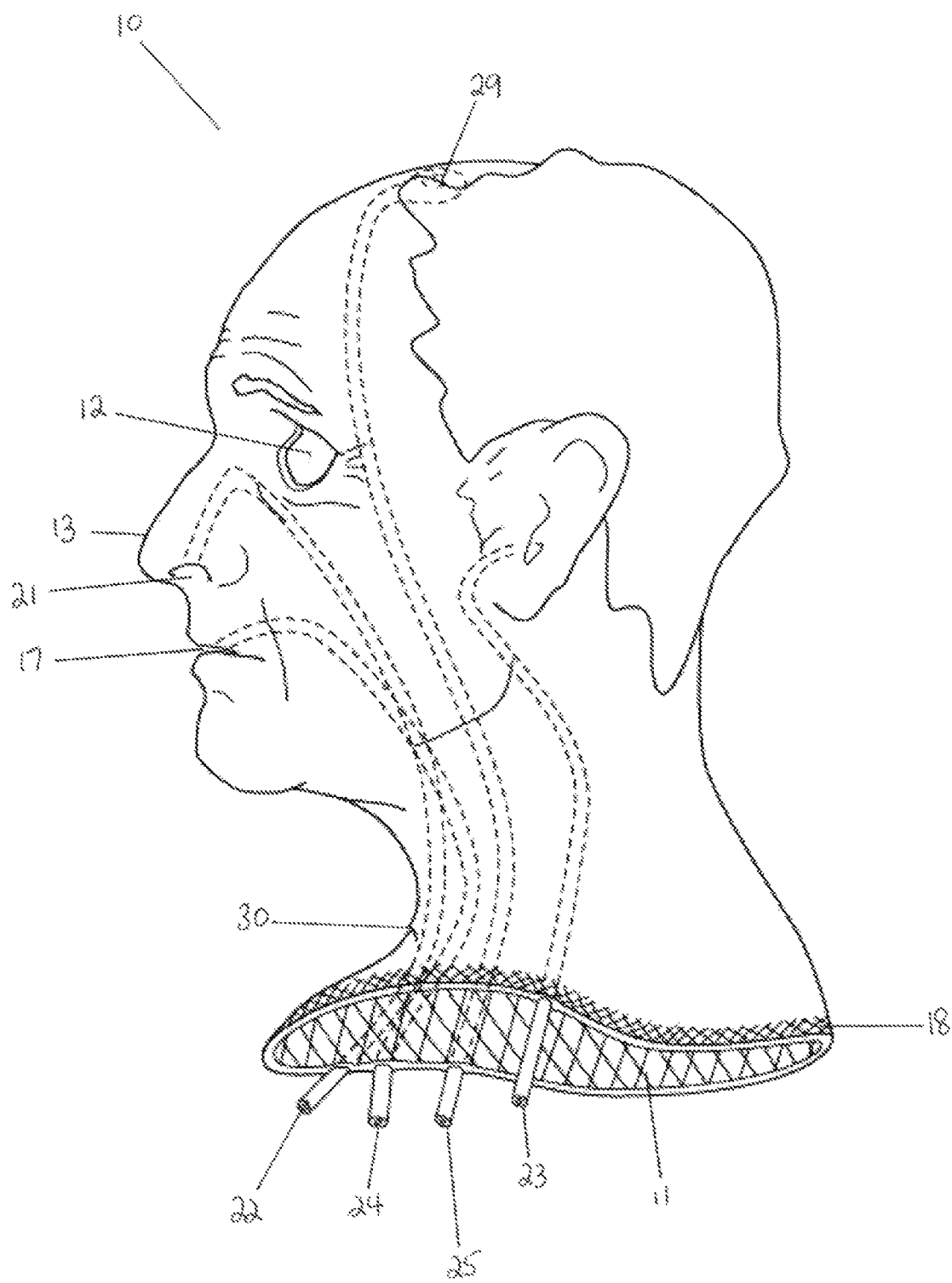
FIG. 2 is a diagrammatic side view of the mask of FIG. 1.
Figure 3:
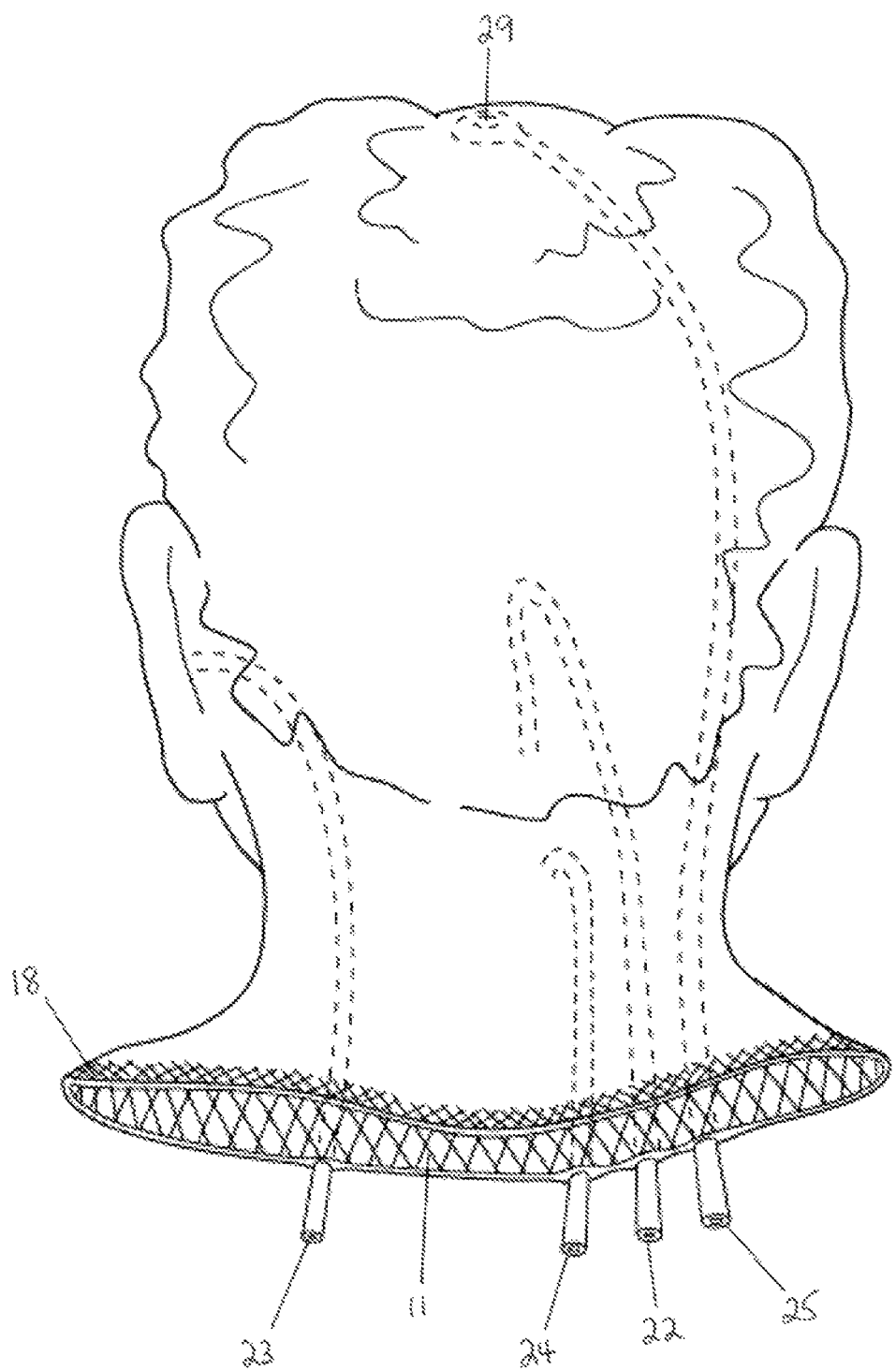
FIG. 3 is a diagrammatic back view of the mask of FIG. 1.

With reference to FIGS. 1 to 3 there is shown a silicone mask prop 10 in accordance with a first preferred embodiment of the present invention. The mask 10 is one-piece, and has an opening 11 to allow the mask to be pulled on over the wearer's head and neck. There is a reinforcing mesh 18 around the edge of the opening 11 to prevent tearing when the wearer is donning or removing the mask 10. The mask 10 comprises real hair 19 and eyebrows 20 embedded in the silicone. The mask 10 comprises eyes 12, nose 13, lips 14 and ears 15. The eyes 12 comprise apertures 16 to allow the wearer to see. The lips 14 have a mouth aperture 17 to allow the wearer to speak. The nose 13 has nostril apertures 21 to allow the wearer to breathe. The ears 15 each have an aperture to allow the wearer to hear.

The mask 10 is fitted with internal silicone conduits 22-25. These conduits 22-25 are connected to external features, and allow the wearer to control the emission of simulated physiological fluids to mimic symptoms of clinical conditions. The nose 13 comprises an internal aperture 26 connected to an internal conduit 22 in a nostril 21 to enable the expulsion of simulated physiological fluid, such as simulated blood, to be expelled from the nostrils under the control of the wearer.

Silicone conduit 23 is connected to an aperture 27 in an ear 15 to facilitate expulsion of simulated physiological fluids from the ear 15 under the control of the wearer.

Silicone conduit 24 is connected to an aperture 28 inside the lips 14 to allow simulated physiological fluids to be expelled from the mouth under the control of the wearer.

The end of each of the conduits 22-24 remote from an aperture 26-28 is adapted to engage with the nozzle of a fluid-filled syringe (not shown) filled with simulated physiological fluid (not shown). The wearer can cause fluid to be emitted from an aperture 26-28 by operation of the appropriate fluid filled syringe.

Conduit 25 is connected to a simulated haemotoma 29. The wearer may control the haemotoma using a fluid filled bulb (not shown) connected to the opposite end of the conduit 25 from the haemotoma 29.

Mask 10 comprises an aperture 30 in the throat area to simulate a tracheotomy and accommodate a tracheotomy tube. The aperture 30 may be fitted with a tracheotomy tube (not shown) to allow demonstration and practice of tracheotomy management.

The mask 10 may be worn on its own, but preferably the mask will be worn with suitable additional props such as clothing and spectacles. The mask may also be used in conjunction with other body part props such as limbs or torso.

The mask prop illustrated in FIGS. 1 and 2 has male features. The mask may be have male or female features, and may also have different features to reflect different age groups.

Figure 4:
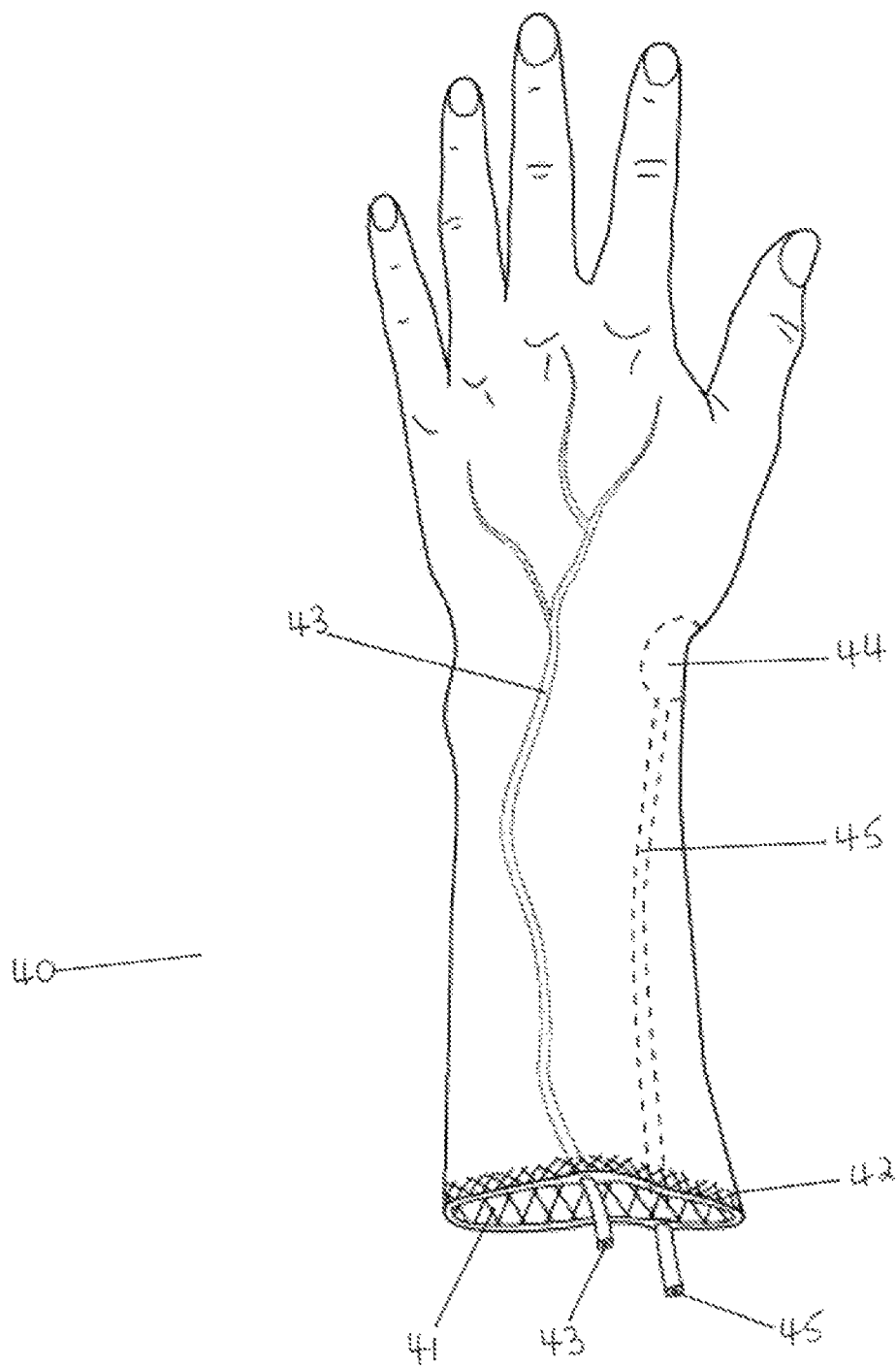
FIG. 4 is a diagrammatic back view of a forearm prop according to a second preferred embodiment of the present invention.
Figure 5:
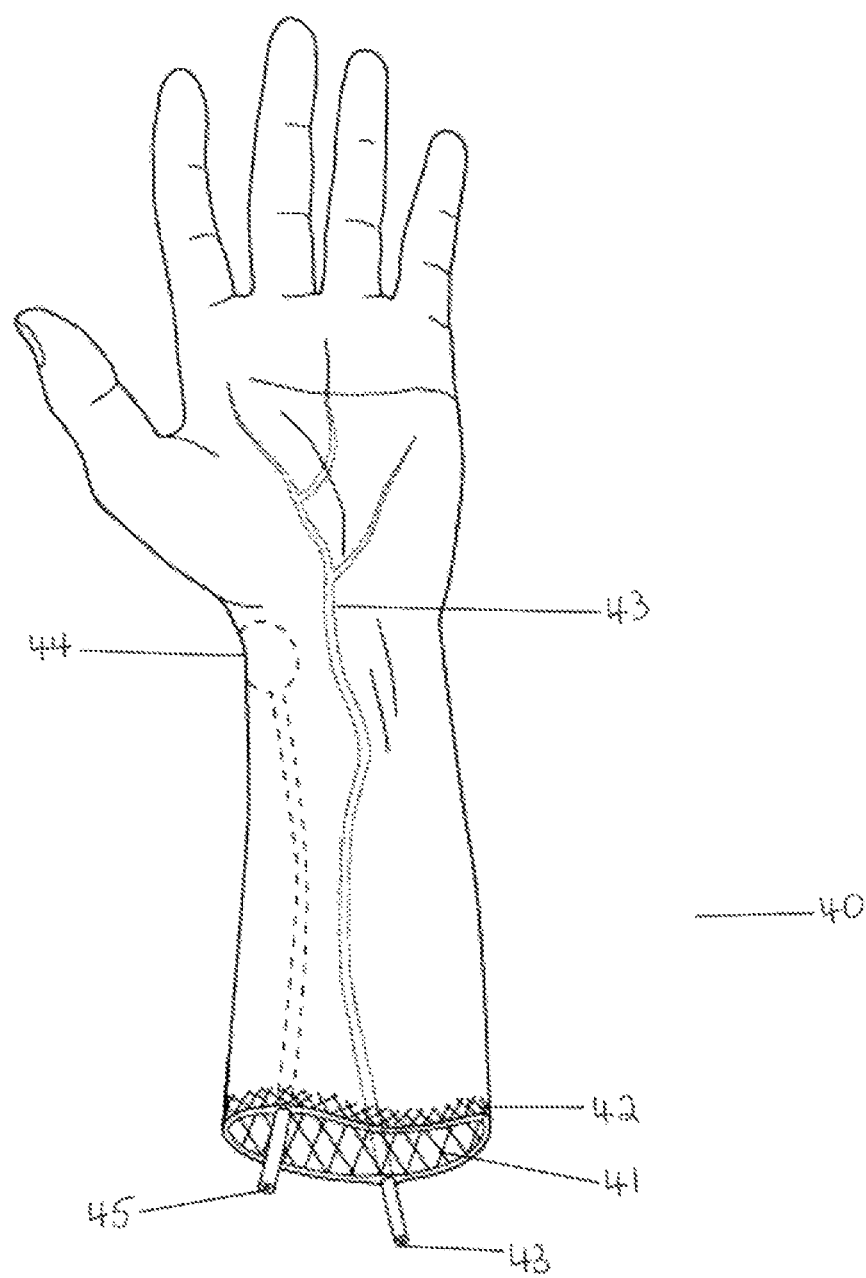
FIG. 5 is a diagrammatic front view of the forearm of FIG. 4.

With reference to FIGS. 4 and 5 there is shown a silicone forearm prop 40 in accordance with a second preferred embodiment of the present invention. The forearm prop 40 is in the form of a glove with an opening 41 reinforced with mesh 42 to prevent tearing when donning or removing the prop. The forearm 40 comprises internal simulated vasculature 43 made from silicone tubing. The simulated vasculature 43 is filled with simulated blood (not shown) to enable demonstration and practice of venepuncture techniques such as withdrawing blood samples, administering intravenous injections and inserting venous cannulae.

The forearm prop 40 comprises a simulated radial pulse. The pulse is controlled by the wearer by altering the pressure on a plunger of an air filled syringe (not shown) attached by the syringe nozzle to an internal length of silicone tubing 45 with a balloon end 44 positioned under the simulated skin or tissue in the location of the radial pulse.

Figure 6:
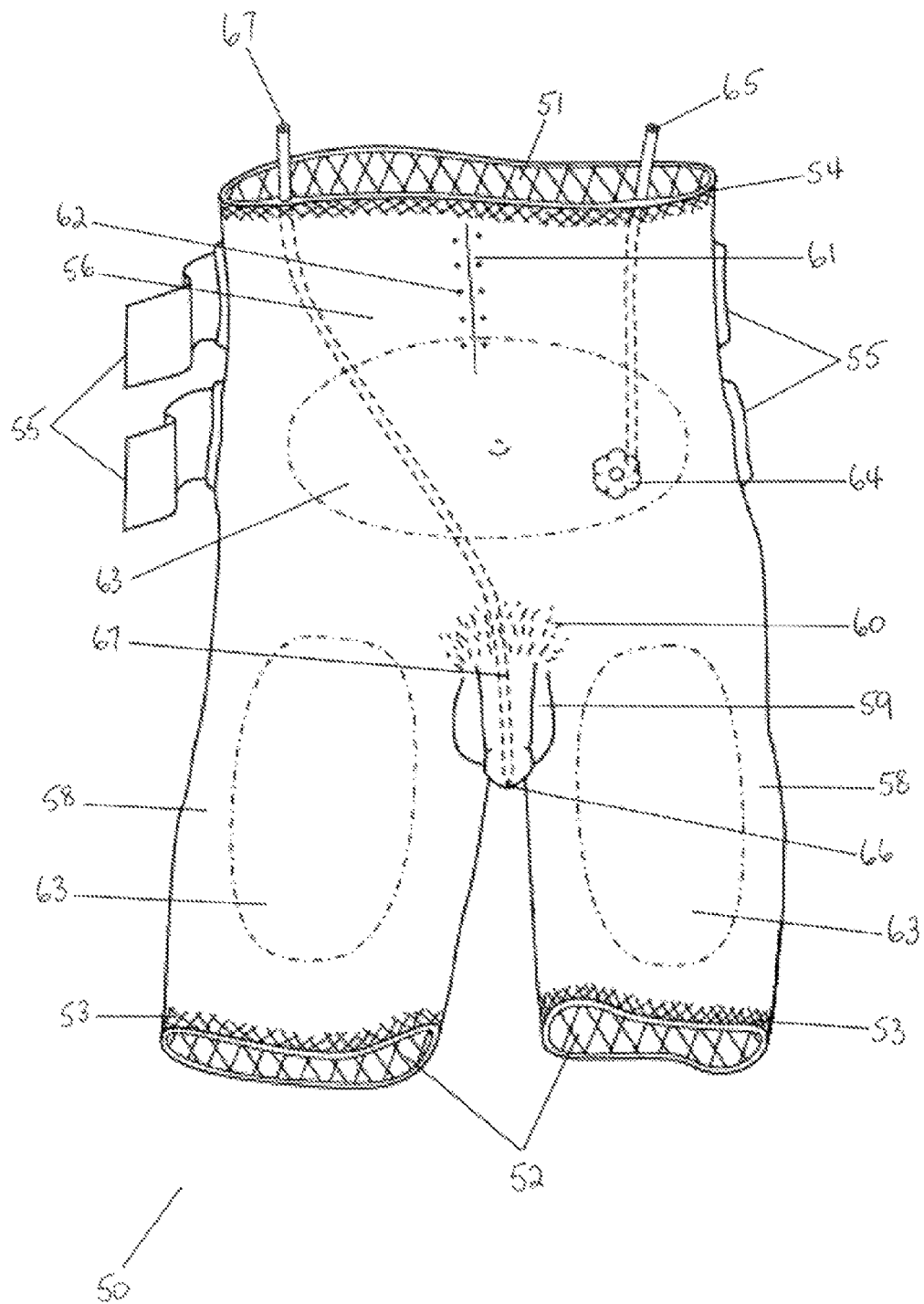
FIG. 6 is a diagrammatic front view of a male torso prop according to a third preferred embodiment of the present invention.
Figure 7:
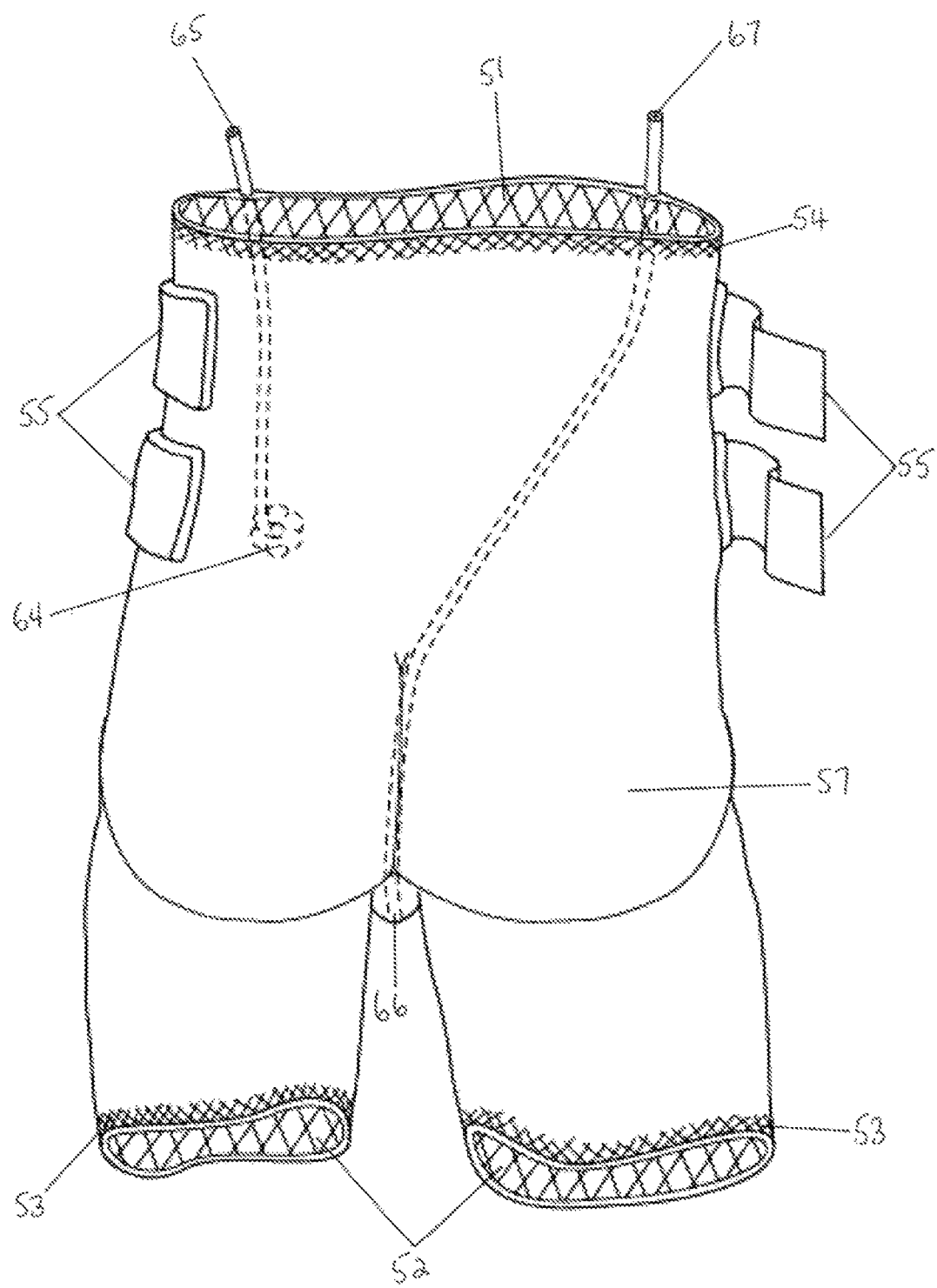
FIG. 7 is a diagrammatic back view of the torso of FIG. 6.

With reference to FIGS. 6 and 7 there is shown a silicone male torso prop 50 in accordance with a third preferred embodiment of the present invention. The torso prop 50 is in the form of a silicone body suit with openings 51 and 52 to accommodate the legs and thorax of the wearer. The openings around the legs 52 and thorax 51 are reinforced with mesh 54 to prevent tearing of the silicone when donning or removing the torso.

There are side openings with hook-and loop (Velcro™) closures 55 to enable the wearer in donning and removing the torso prop quickly. The torso prop 50 comprises an abdomen 56, buttocks 57, thighs 58 and male genitals 59. The torso prop 50 also comprises body hair 60 embedded in the silicone skin or tissue.

The torso prop 50 has a simulated abdominal surgical incision 61 including removable surgical sutures or staples 62 for demonstrating and practicing wound management and insertion and removal of sutures and staples. The torso prop 50 may also comprise a simulated surgical drain hole adapted to allow insertion or removal of drainage tubes (not shown).

The torso comprises injectable cavities 63 on the abdomen and upper legs to allow students to practice injecting fluid. The injectable cavities 63 comprise a removable foam pad (not shown) contained in a cavity under the silicone skin or tissue to receive fluid injected through the skin or tissue. The cavity has a Teflon™ internal wall (not shown) on the inside face of the cavity to protect the wearer from being accidentally punctured by a needle.

The torso prop comprises a simulated stoma 64. The stoma 64 is connected to a silicone tube 65 on the inner wall of the torso prop. The other end of the silicone tube 65 is adapted to engage with the nozzle of a fluid-filled syringe. The wearer can operate the syringe force exudate out of the stoma 64 to mimic expulsion of faecal fluid.

The male genitalia 59 comprises an aperture 66 connected to a silicone tube 67 which forms a urethra. Simulated urination can be effected by the wearer operating a fluid filled syringe (not shown) attached by its nozzle to the opposite end of the silicone tube 67. The silicone urethra 67 may also be used to demonstrate and practice insertion or removal of a catheter.

The synthetic torso prop is preferably worn in conjunction with a face mask and suitable clothing such as pyjamas.

The torso prop exemplified herein is male. A female torso may comprise similar clinically relevant and physiological features, but will comprise female genitalia instead of male genitalia.

Figure 8:
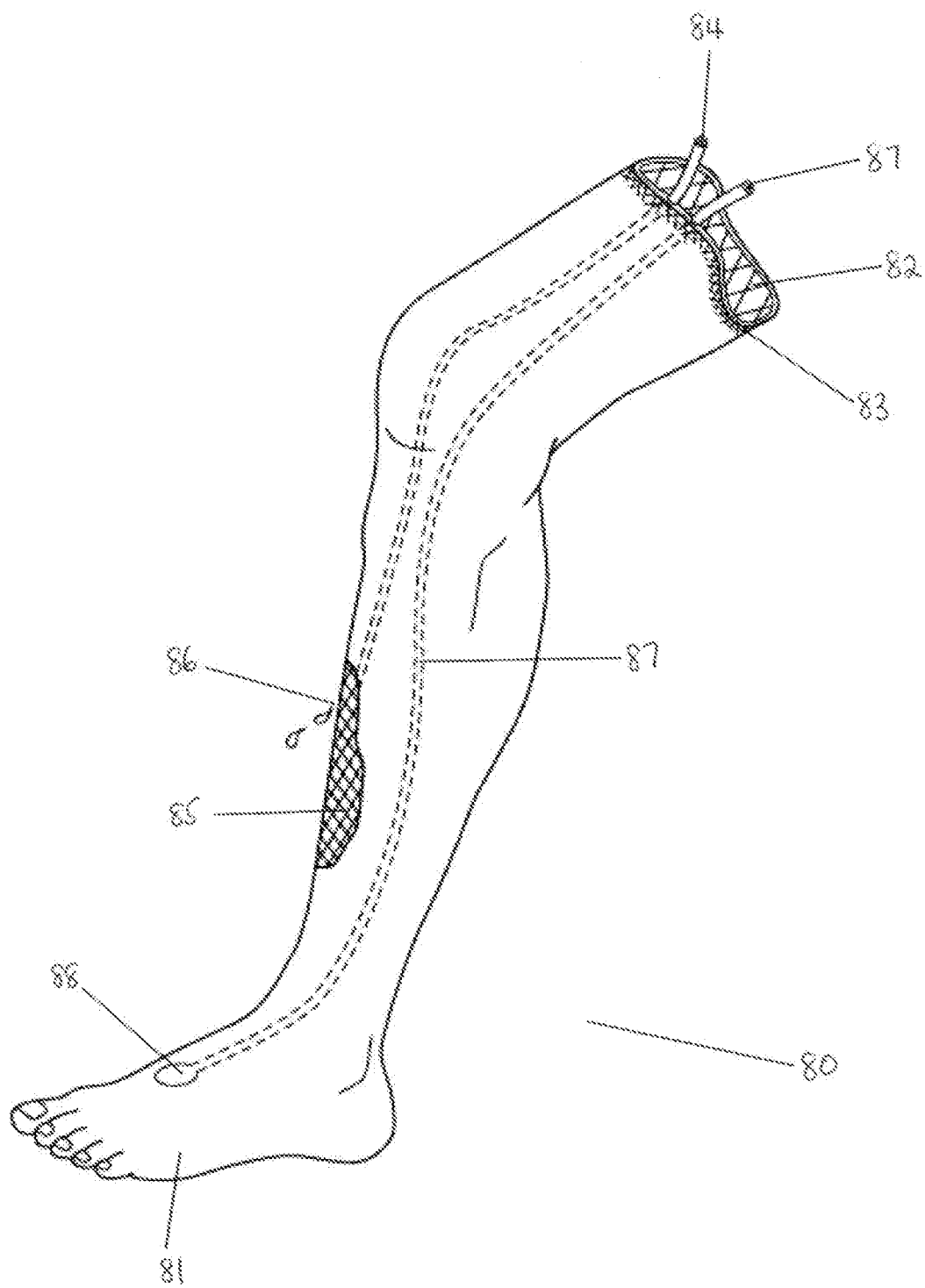
FIG. 8 is a diagrammatic front view of a leg prop according to a fourth preferred embodiment of the present invention.
Figure 9:
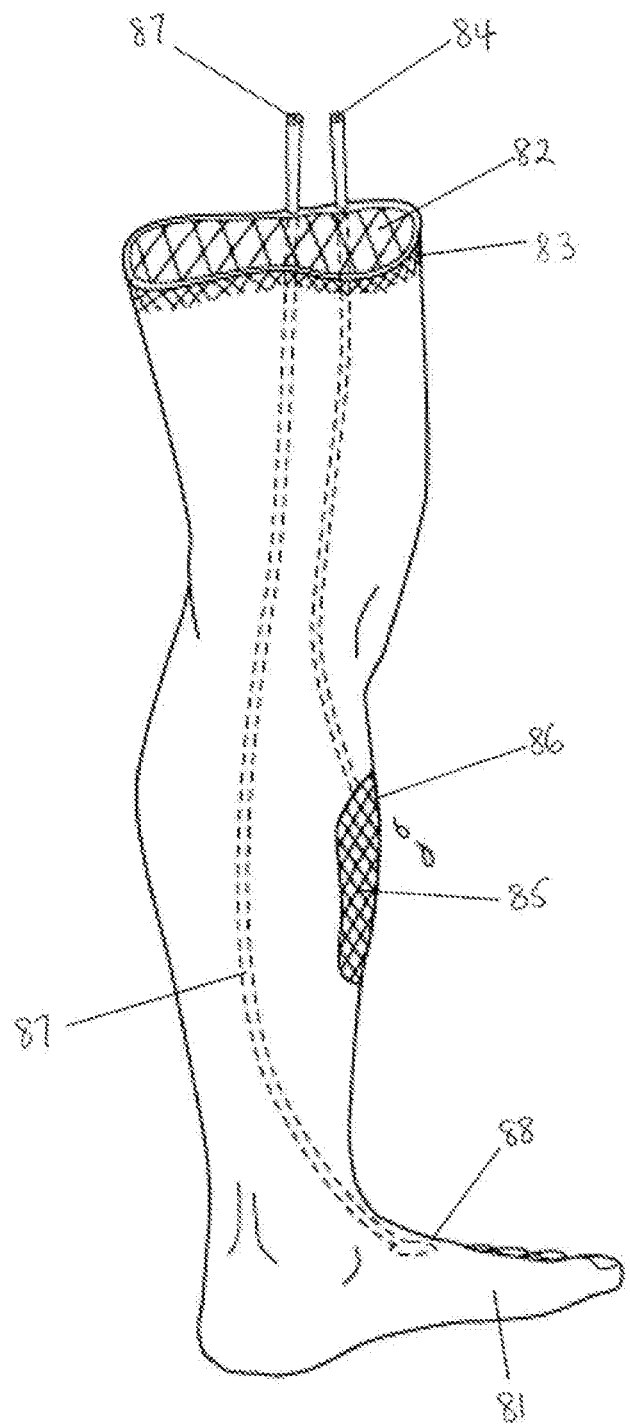
FIG. 9 is a diagrammatic rear view of the leg prop of FIG. 8.

With reference to FIGS. 8 and 9 there is shown a silicone leg prop 80 in accordance with a fourth preferred embodiment of the present invention. The leg prop 80 comprises a foot portion 81. The leg is in the form of a silicone stocking with a mesh reinforcing band 83 around the opening 82 to prevent tearing of the silicone.

The leg prop 80 comprises a simulated venous ulcer 85 with an aperture 86. The aperture 86 is connected to an internal silicone tube 84. The other end of the tube 84 is adapted to engage with the nozzle of a fluid filled syringe (not shown) to allow the wearer to simulate excretion of a physiological fluid from the ulcer by operating the fluid filled syringe.

The leg prop 80 comprises a simulated pulse at the point of the dorsalis pedis artery on the foot 81. The pulse is controlled by the wearer by altering the pressure on a plunger of an air filled syringe (not shown) attached by the syringe nozzle (not shown) to an internal length of silicone tubing 87 with a balloon end 88 positioned under the simulated skin or tissue in the location of the point of the dorsalis pedis artery on the foot 81.

The synthetic leg prop is preferably worn in conjunction with a face mask and other props such as clothing.

The body parts are made from silicone. Preferably the body parts are made from a high quality lightweight silicone skin or tissue and are fitted with real hair embedded in the silicone skin or tissue.

When referred to herein "simulated physiological fluids" comprise, but are not limited simulated blood, urine, pus, saliva, vomit and fecal fluid.

Advantages

An advantage of the preferred embodiments of the present clinical teaching props is that the simulated body parts allow students to practice various clinical procedures and techniques on a person without any risk or discomfort to the patient. A procedure can be repeated as many times as is required by any number of students. The instructor's experience and knowledge of medical conditions and clinical procedures can be used to provide authenticity to the role play situation since the instructor can provide appropriate sound and movement to mimic pain, fear, or distress in response to clinical procedures such as injections or removal of a catheter, drain or sutures.

The simulated body parts may be used to demonstrate a wide variety of physiological functions and conditions to students. The body parts may also be used in demonstration and practice of a variety of clinical procedures. The clinical procedures may be repeated frequently, thus allowing multiple students to practice a procedure.

Since the patient role is played by an experienced and knowledgeable tutor, the tutor will be able to provide a series of realistic reactions to procedures and be able to provide authentic information to the students to assist in reinforcing the teaching of important points. The use of a face mask together with additional props such as clothing, and disguised voice allows the tutor to fully assume the character of a patient and allows students to dissociate the patient character from the tutor.

Variations

It will of course be realized that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A synthetic body part teaching prop wearable by a person, said prop including
   at least a full head mask which comprises simulated skin or tissue and one or more functional features to simulate medically relevant conditions;
   said at least a full head mask has a nose, lips, ears and apertures to accommodate the person's eyes and mouth; and
   said at least a full head mask includes one or more internal conduits adapted to contain or passage there-through at least one simulated physiological fluid to simulate physiological functions or clinical procedures for clinical education purposes;
   wherein in use the at least full head mask supports the person to assume the character of a patient,
   wherein the teaching prop is a full head and neck mask or a full head, neck and upper chest mask and including an opening in an anterior area of the neck to accommodate a tracheotomy tube.

2. A synthetic body part teaching prop wearable by a person, said prop including
   at least a full head mask which comprises simulated skin or tissue and one or more functional features to simulate medically relevant conditions;
   said at least a full head mask has a nose, lips, ears and apertures to accommodate the person's eyes and mouth; and
   said at least a full head mask includes one or more internal conduits adapted to contain or passage there-through at least one simulated physiological fluid to simulate physiological functions or clinical procedures for clinical education purposes;
   wherein in use the at least full head mask supports the person to assume the character of a patient,
   wherein there is a torso that has a stoma, said stoma is connected to a tube through which fluid is passaged to simulate expulsion of fecal fluid.

* * * * *